No. 767,755. PATENTED AUG. 16, 1904.
W. R. HOLDER.
CAN OPENER.
APPLICATION FILED MAR. 18, 1904.
NO MODEL.

Witnesses
E. F. Stewart
C. N. Woodward

William R. Holder,
Inventor.
by C. A. Snow & Co.
Attorneys

No. 767,755.

Patented August 16, 1904.

UNITED STATES PATENT OFFICE.

WILLIAM ROBERT HOLDER, OF BAINBRIDGE, GEORGIA.

CAN-OPENER.

SPECIFICATION forming part of Letters Patent No. 767,755, dated August 16, 1904.

Application filed March 18, 1904. Serial No. 198,805. (No model.)

*To all whom it may concern:*

Be it known that I, WILLIAM ROBERT HOLDER, a citizen of the United States, residing at Bainbridge, in the county of Decatur and State of Georgia, have invented a new and useful Can-Opener, of which the following is a specification.

This invention relates to implements for cutting the closure ends of hermetically-sealed cans, and has for its object to provide a simply-constructed and efficient implement which may be readily adapted for operation upon any size of can and to cans of different shapes.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

Figure 1:
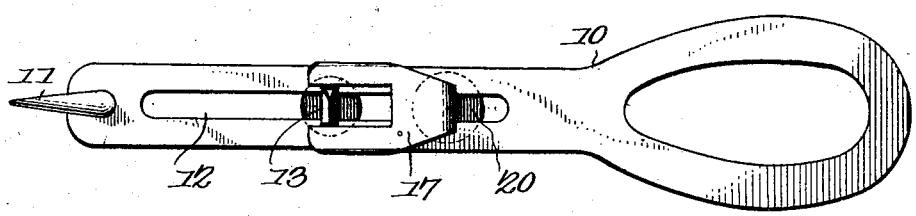
Figure 2:
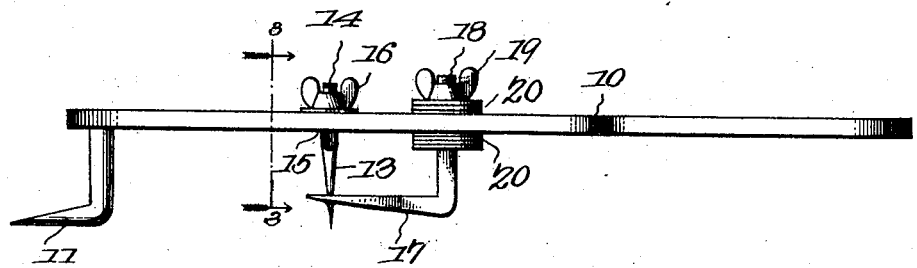
Figure 3:
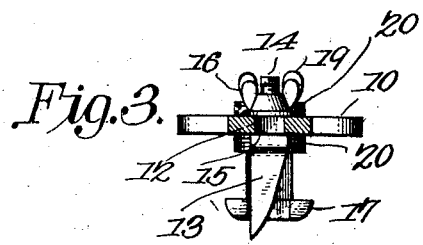

In the drawings thus employed, Figure 1 is a bottom plan view. Fig. 2 is a side elevation. Fig. 3 is a transverse section on the line 3 3 of Fig. 2.

The improved implement comprises a handle member 10, preferably of steel or other suitable metal, having at one end a forwardly-extending pointed hook 11 for entering the can-cover to "center" the implement when operating for cutting a circular cleft in the can-cover and with a longitudinal slot 12. Mounted for longitudinal adjustment in said slot is a cutter 13, having a threaded shank 14 for passing through the slot and with a shoulder 15 bearing against the handle member on one side and with a wing-nut 16 engaging the shank and bearing upon the handle on the other side. The cutter is formed straight on one side and curved upon the other side, so that a "shear-like" action results when in operation to reduce the power required to operate it, as hereinafter explained. Mounted for adjustment longitudinally in said slot 12 is a guard member 17, having a threaded shank 18 extending through the slot 12 and provided with a wing-nut 19. The guard member is forked, as shown, and extends transversely of the cutter member and is spaced from its cutting end or so disposed that a portion only of the cutter extends in advance of the guard member. The outer surfaces of the forked portion of the guard member are inclined transversely of the longitudinal plane of the cutter, so that by adjusting the guard member longitudinally of the handle member and transversely of the cutter the extent of the projection of the cutter relative to the guard may be controlled. Thus in event of the wear of the cutter the guard may readily be adjusted to maintain the uniform projection of the cutter.

Surrounding the shank 18 of the guard between the wing-nut 19 and the handle 10 and also between the handle and the guard member 17 are a plurality of washer-like spacers 20 to provide a simple means for adjusting the guard member laterally relative to the handle member. It will be obvious by this simple arrangement that by transposing the spacers upon opposite sides of the handle member any desired degree of lateral adjustment may be imparted to the guard member.

By this arrangement of parts it is obvious that a simple, efficient, and convenient implement is provided by means of which a circular cleft may be quickly cut through the can-closure and the depth of the cutting guarded and gaged by the coaction of the member 17 and cutter 13. The implement will also be found very efficacious for cutting square or oblong clefts through the closures of square or oblong cans by simply forcing the cutter 13 through the can and drawing the implement along the same parallel to its edge. The inclining of one side of the cutter is of great assistance in the operation, as by that means a shear-like action results which materially decreases the power required to operate it.

Having thus described the invention, what is claimed is—

1. A can-opener comprising a shank, a cutter carried by the shank and having means to adjustably clamp the same thereon, and a guard carried by the shank independently of the cutter and provided with means to adjustably clamp the guard upon the shank.

2. A can-opener comprising a handle member having a cutter extending laterally therefrom, and a guard adjustably connected to said handle and extending transversely of said cutter and spaced from its cutting end and having means for adjustment longitudinally of said cutter.

3. A can-opener comprising a handle member having a cutter extending laterally therefrom, and a guard adjustably connected to said handle and with a forked terminal for extending upon opposite sides of said cutter and spaced from its cutting end.

4. A can-opener comprising a handle member having a cutter extending laterally therefrom, and a guard adjustably connected to said handle and with a forked terminal for extending upon opposite sides of said cutter and spaced from its cutting end, and having means for adjustment longitudinally of said cutter.

5. A can-opener comprising a shank having a longitudinal slot, a cutter carried within the slot of the shank and adjustable longitudinally therein, and a guard also mounted in the slot and adjustable longitudinally of the shank independently of the cutter.

6. A can-opener comprising a shank, a cutter carried thereby and adjustable longitudinally thereon, and a guard adjustable longitudinally upon the shank and also adjustable toward and away from the shank to regulate the active portion of the cutter.

7. A can-opener comprising a handle member having a cutter extending laterally therefrom, and a guard adjustably connected to said handle and extending transversely of said cutter and spaced from its cutting end and likewise having means for adjustment longitudinally of said cutter.

8. A can-opener comprising a handle member having a cutter disposed laterally thereto, a guard member extending transversely of the cutter and spaced from its cutting end and provided with a threaded shank, a wing-nut engaging said shank, and a plurality of spacing-washers engaging shank and bearing upon said handle member, whereby said guard may be adjusted longitudinally of said cutter.

9. A can-opener comprising a shank, a cutter carried thereby, and a guard having its outer face inclined transversely across the cutter and adjustable across the cutter to regulate the length of the active portion thereof.

10. A can-opener comprising a shank having a cutter, and a guard having its outer face inclined transversely across the cutter, said guard being adjustable toward and away from the cutter to regulate the length of the active portion thereof and also adjustable toward and away from the shank to accommodate the guard to wear upon the cutter.

11. A can-opener comprising a shank terminating at one end in a handle and at its opposite end in a hooked projection, the shank being provided with a longitudinal slot, a cutter-blade disposed transversely of the shank and having a screw-threaded projection located in the slot and adjustable longitudinally thereof, a nut fitted to the screw-threaded projection of the cutter and bearing against the shank, and a guard including a fork straddling the cutter with the lower faces of the fork members inclined transversely across the cutter, one end of the fork having a screw-threaded shank located in the slot and adjustable longitudinally thereof, removable washers upon the shank of the fork, and a nut upon said shank.

In testimony that I claim the foregoing as my own I have hereto affixed my signature in the presence of two witnesses.

WILLIAM ROBERT HOLDER.

Witnesses:
  E. A. WIMBERLEY,
  D. L. O'NEAL.